3,463,704
METHOD OF PRODUCING ALANINE BY ENZYME ACTION
Shinji Okumura, Yokohama-shi, Kanagawa-ken, and Fumihiro Yoshinaga, and Yasuhiko Yoshihara, Kawasaki-shi, Kanagawa-ken, Japan, assignors to Ajinomoto Co., Inc., Tokyo, Japan
No Drawing. Continuation of application Ser. No. 527,512, Feb. 15, 1966, which is a continuation of application Ser. No. 506,889, Nov. 8, 1965. This application Sept. 30, 1968, Ser. No. 766,374
Claims priority, application Japan, Nov. 9, 1964, 39/63,247; Nov. 13, 1964, 39/63,789
Int. Cl. C12d 13/06; C07c 99/00
U.S. Cl. 195—29     4 Claims

ABSTRACT OF THE DISCLOSURE

L-alanine is formed by enzymatic decarboxylation of L-aspartic acid when an aqueous solution of the latter is mixed with a culture broth in which Pseudomonas species No. 618 (ATCC No. 19,121) was cultured, and the resulting mixture is kept at pH 4.5 to 5.5 under aerobic conditions at 25° to 45° C. The L-alanine is recovered by conventional methods.

---

This application is a continuation of our copending application Ser. No. 527,512, filed on Feb. 15, 1966, now abandoned, which itself is a continuation of our application Ser. No. 506,889, filed on Nov. 8, 1965, now abandoned.

This invention relates to the production of L-alanine by enzyme action.

L-alanine is a non-essential amino acid, but it is used as a food supplement in medicine. It also has found applications as raw material in the production of synthetic fibers. L-alanine has been produced heretofore by optical resolution of synthetic DL-alanine and by enzymatic reductive amination or transamination of pyruvic acid.

An object of the invention is the production of optically active L-alanine at low cost from readily available raw materials, and another object is the production of L-alanine in a simpler and easier operation than was available heretofore.

According to the present invention, a suitable enzyme source is mixed with an aqueous solution of L-aspartic acid, and the mixture is allowed to stand at about pH 5 until L-alanine is produced therein by β-decarboxylation of the L-aspartic acid. The preferred enzyme source is Pseudomonas species No. 618 (ATCC No. 19,121) in the form of a liquid culture medium containing the microorganisms as a suspension, an extract of ground cells, or a filtered culture medium or extract free of cells.

It is known to analyze liquids for their content of L-aspartic acid by enzymatic decarboxylation from the following publications:.

Mikrobiokhimiya vol. 14, p. 44, 1949 (using Pseudomicobacterium); Journal of Biological Chemistry 189 (1951) 571–576 (using *Clostridium verchi*); and Biochemical Journal 68 (1958) 221–225, (using *Nocardia groberla*) have been known already. The amount of gas produced is measured in a Warburg manometer. The concentration of L-aspartic acid that can be determined is very low, about 0.1%, and the amount of α-alanine produced is small, less than 50 mg./dl. These analytical methods are not suitable for industrial production of L-alanine.

We have found that L-alanine is formed rapidly and can be accumulated in relatively high concentrations when L-aspartic acid reacts with the enzyme produced by Pseudomonas species No. 618.

This microorganism has been found in soil and seems to be a species of the genus Pseudomonas. However, we cannot find a known species to which it could belong and it is believed to be a new species.

Its characteristic properties are as follows:

Shape and motility.—Rods, 0.8 by 1.4 to 1.8 microns. Vacuolated cells are observed. Motile with polar flagella. Gram-negative. Sport not formed
Nutrient agar colonies.—Circular, smooth, entire, raised, glistening, pale yellowish brown, opalescent, butyrous.
Glutamate agar colonies.—Circular, smooth, entire, flat to raised, pale yellowish gray, transparent, butyrous
Nutrient agar slant.—Growth moderate, filiform, glistening, pale brown
Glutamate agar slant.—Growth moderate, filiform, flat, glistening, pale yellowish gray
Nutrient broth.—Fragile pellicle, strong turbidity
Glutamate broth.—Fragile pellicle, strong turbidity. Soluble pigment not formed
Nutrient gelatin stab.—Liquefaction
B.C.P. milk.—Alkaline, slightly peptonized after 40 days.

Nitrite is produced from nitrate in nitrate broth and succinate-nitrate broth.

Nitrate respiration.—Negative
Hydrogen sulfide.—Produced
Starch hydrolysis.—Not hydrolyzed
Indole.—Not produced
M.R. test—Negative
V–P test.—Negative
Gas and acid from carbohydrates.—No acid or gas is produced from glycerol, xylose, glucose, sucrose, lactose and starch in peptone media
Gas and acid by Hugh-Lifson's method.—No acid or gas is produced, aerobically or anaerobically from glucose and lactose Glucose, gluconate, succinate, m-hydroxy-benzoate, p-hydroxy-benzoate, protocatechuate and gentisate are utilized as a sole source of carbon with ammoniacal nitrogen, but citrate, benzoate, salicylate and anthranilate are not utilized.

Optimum temperature for growth.—20° C. to 30° C. Weak growth at 37° C., no growth at 42° C.
Optimum pH for growth.—Between pH 5.0 and pH 9.0. No growth at pH 4.0.
Catalase.—Positive
Aerobic
Source.—Soil.

The above-described characteristic properties resemble those of *Pseudomonas desmolytica* or *Pseudomonas dacunhae* as described in "Bergey's Manual of Determinative Bacteriology," 7th edition, but Pseudomonas species No. 618 differs from these two species in the liquefaction of gelatin and B.C.P. milk.

The enzyme of Pseudomonas species No. 618 has alanine racemiase activity, and the L-alanine produced by $\beta$-decarboxylation of L-aspartic acid is gradually racemized. However, the optimum pH value for alanine racemiase activity is 8.0, and that for L-aspartic acid $\beta$-decarboxylase is about 5.0, as is evident from Table 1 which lists results of the following tests:

A culture medium was prepared from 2% meat extract, 2% of polypepton, 0.3% oleic acid, 0.5% ethanol, 0.5% bean oil, and 0.5% L-aspartic acid, and its pH was adjusted to 6.0 by addition of aqueous ammonia. 30 milliliter batches of the medium were placed in 500 milliliter flasks, and the flasks with their contents were sterilized at 110° C., for five minutes. The sterilized medium was inoculated with Pseudomonas species No. 618 (ATCC No. 19,121) which had previously been grown on a bouillon agar slant. The culture was held at 31° C. for 15 hours while the flasks were being shaken. The ammonium salt of L-aspartic acid was added to each culture medium in an amount to make the concentration 75 grams per liter, and the pH was thereafter controlled as shown in Table 1. The fermentation was carried out at 31° C. for 50 hours with shaking.

L-aspartic acid was determined in the fermentation broth by bioassay using *Leuconostoc mesenteroids*, $\alpha$-alanine was determined by bioassay using *Leuconostoc citrovorum*, and D-alanine was determined by Warburg's manometric method using D-amino acid oxydase of sheep's kidney.

Because the L-aspartic acid was originally present as a salt, the fermentation mixture tended to become alkaline which interferes with the $\beta$-decarboxylation reaction and enhances the conversion of L-alanine to D-alanine by alanine racemiase. For good yields of L-alanine, the pH must be held at about 5.0 in order to prevent racemization.

The enzyme for the present method is available in the living bacterial cells, in ground cell material, in the cell-free, filtered culture broth, but also in the culture itself. The media employed for culturing Pseudomonas species No. 618 may be entirely conventional in other respects. They must contain an assimilable carbon source, an assimilable nitrogen source, and the usual minor nutrients. Suitable carbon sources include carbohydrates, such as glucose, fructose, maltose, sucrose, xylose, galactose, starch hydrolyzate and molasses, but also glycerol. Organic acids such as acetic acid, fumaric acid, malic acid, lactic acid, $\alpha$-ketoglutaric acid, gluconic acid, pyruvic acid, and citric acid may be employed as supplemental carbon sources. The concentration of the carbon source in the culture medium is normally between 1 and 5% by weight, based on glucose equivalents. Nitrogen may be provided by ammonium salts of inorganic or organic acids, such as hydrochloric, phosphoric, nitric, acetic and lactic acid, by urea, and by ammonia in aqueous solution or in the gaseous state. Amino acids, organic bases, and other organic nitrogen bearing materials may be assimilated. The concentration of the nitrogen source in the culture medium is normally between 0.3 and 1.5% by weight in nitrogen equivalent. It is also useful to employ supplemental inorganic nutrients including the essential inorganic ions available from potassium phosphate, magnesium sulfate, manganese sulfate, zinc sulfate, ferrous sulfate, sodium chloride and calcium carbonate. Known organic growth promoting agents improve the yield and the rate of production of L-alanine and include amino acids generally, biotin, vitamins and fatty acids, and may be added to the culture medium in the form of substances which yield to the active agent under the conditions of culturing, such as meat extract, peptone, yeast extract, corn steep liquor, skim milk, chlorella extract, soybean protein hydrolyzate, and various other extracts of vegetal and animal tissues, well known in themselves. A small amount of L-aspartic acid is preferably added to the medium.

We have also found that the growth of Pseudomonas species No. 618 is increased by employing a medium which is mainly composed of Ajieki (brand name of soy bean protein hydrolyzate) and lower mono- and di-saturated alcohols or glycerin.

TABLE 1

| pH controlled by adding | To | Total alanine g./dl. | Residual aspartic acid, g./dl. | Conversion rate, percent | D-alanine G./dl. | Percent |
|---|---|---|---|---|---|---|
| no pH control | 8.0–9.0 | 1.30 | 2.24 | 26 | 0.31 | 24 |
| 3N-HCl | 5.0–5.5 | 3.40 | 0.03 | 68 | 0.03 | 1 |
|  | 6.5–7.5 | 3.03 | 0.03 | 62 | 0.42 | 14 |
| L-aspartic acid | 5.0–5.5 | 5.60 | 2.80 | 51 | 0.06 | 1 |
|  | 6.5–7.5 | 5.05 | 3.25 | 43 | 0.43 | 9 |

The following Table 2 shows results of experiments with various carbon sources.

TABLE 2

| Carbon source | G./dl. | Growth* of P. sp. No. 618 after 24 hours (−log T) |
|---|---|---|
| Glucose | 1 | 0.120 |
| Do | 4 | 0.120 |
| Fructose | 1 | 0.100 |
| Maltose | 1 | 0.118 |
| Sucrose | 1 | 0.105 |
| Xylose | 1 | 0.100 |
| Methanol | 0.5 | 0.123 |
| Ethanol | 0.5 | 0.130 |
| Do | 1.0 | 0.305 |
| Do | 1.5 | 0.415 |
| Do | 2.0 | 0.245 |
| n-Propanol | 0.5 | 0.120 |
| n-Butanol | 0.5 | 0.250 |
| Ethylene glycol | 0.5 | 0.280 |
| Glycerine | 0.5 | 0.295 |
|  |  | 0.300 |

*0.2 ml. of the broth were added to 5 ml. of distilled water and the absorbency of this solution was measured by using photoelectric colormeter at 562 m$\mu$.

Each culture medium additionally contained 0.1% $KH_2PO_4$, 0.04% $MgSO_4 \cdot 7H_2O$, 2 p.p.m. $Fe^{++}$, 2 p.p.m. $Mn^{++}$, 200 $\gamma$/l. thiamine hydrochloride, 20 $\gamma$/l. biotin, 0.5% L-aspartic acid, and 5 ml./dl. Ajieki (soy beam protein hydrolyzate).

Each medium was adjusted to pH 6.5 by means of KOH, and 5 ml. batches of the solution were placed in large test tubes, and were sterilized by steam at 110° C. for 5 minutes except alcohol and glycol which were sterilized separately. Pseudomonas species No. 618 was cultured at 31° C. for 24 hours with shaking.

The soy bean protein hydrolyzate had a total nitrogen content of 2.2 g./l., it contained 21 g./dl. solids and 18 g./dl. NaCl. Ajieki contains many materials necessary for the growth of microorganisms and may replace inorganic ions, vitamins, and a nitrogen source.

As it is apparent from Table 2, the growth of the microorganisms is increased when lower alcohols or glycols are employed with the Ajieki. The quantity of $\beta$-decarboxylase produced by the microorganisms is increased correspondingly.

The preferred lower alcohols are methanol, ethanol, n-propanol and n-butanol, and the preferred lower glycols are ethylene glycol and glycerine.

The amount of Ajieki to be employed in the culture medium is about 5 ml./dl., and best results are obtained when about 1% ethanol is used with the Ajieki.

The microorganisms employed in the present method are cultured under aerobic condition with aeration and agitation at temperatures from 24° C. to 37° C.

The cultivation is usually stopped when enough enzyme is produced, and the cultivation period is usually from 12 hours to 48 hours. The culture may be used as an enzyme source without further treatment.

The β-decarboxylation of L-aspartic acid to L-alanine is carried out by mixing the enzyme source with L-aspartic acid and keeping the mixture at about pH 5.0. Aeration and agitation are preferred to promote the release of carbon dioxide.

The L-aspartic acid employed as a fermentation substrate is preferably supplied in the form of the free acid or as the ammonium, sodium or potassium salt.

L-aspartic acid should be present in the fermentation solutinon in a concentration of more than 1%, and 1 to 20% L-aspartic acid are preferred. Suitable sources of L-aspartic acid include not only the pure compound but also a crude broth containing L-aspartic acid formed by fermentation, DL-aspartic acid, and mixtures of D-aspartic acid and L-aspartic acid.

L-aspartic acid is also preferably employed for controlling the pH of the fermentation mixture to which it is added in the free acid form. However, inorganic acids such as hydrochloric acid and sulfuric acid, and other organic acids may also be added to the fermentation mixture from time to time in order to maintain the desired pH range. The fermentation may continue for one day to three days and the temperature of the medium should be held between 24° and 45° C. for best results. Normally, 0.5 to 15 g./dl. of L-alanine are produced corresponding to the L-aspartic acid supplied.

The L-alanine may be recovered from the fermented liquor by known methods.

EXAMPLE 1

A culture medium of the following composition was prepared: 2% meat extract, 2% polypeptone, 0.5% ethanol, 0.5% bean oil. 0.3% oleic acid and 0.5% of L-aspartic acid, and the pH was adjusted to pH 6.0 with aqueous ammonia. 50 ml. batches of the solution were placed in 500 ml. shaking flasks, and were sterilized by steam in the flasks at 115° C. for 10 minutes.

Pseudomonas species No. 618 which was previously cultured on bouillon agar slants was cultured at 31° C. in the prepared medium for 15 hours with shaking.

800 ml. of the culture obtained were poured into a fermentation tank; and 132 g. crystalline L-aspartic acid to the solution at 37° C., with agitation, over a period of 40 hours. The pH of the fermentation liquor was controlled thereafter at 4.7 to 5.2 with 12 N sulfuric acid for a total fermentation time of 48 hours.

The fermentation solution contained 0.05 g./dl. L-aspartic acid (as determined by bioassay with *Leuconostoc mesenteroides*) and 10.82 g./dl. α-alanine (as determined by bioassay with *Leuconostoc citrovorum*) of which 0.18 g./dl. was D-alanine, as determined by Warburg's manometric method with D-amino acid oxydase from sheep's kidney.

Therefore, the L-aspartic acid was converted to L-alanine in a molar yield of 96%.

The microbial cells were removed from the fermentation solution (800 ml.), and the cell-free solution was passed over ion exchange resin (Amberlite IR-45). The clear liquid was concentrated in a vacuo to 150 ml., and 150 ml. ethanol were added. 56.0 g. crystalline crude L-alanine were precipitated.

EXAMPLE 2

A culture medium consisting of 5 ml./dl. Ajieki was sterilized by steam at 115° C. for 10 minutes, 1% ethanol sterilized separately was added, and the mixture was adjusted to pH 6.0 with aqueous ammonia. 50 ml. batches of the solution were placed in sterile 500 ml. shaking flasks.

Each medium was inoculated with Pseudomonas species No. 618 grown on bouillon slants, and was cultured at 31° C. for 24 hours with shaking.

800 ml. of the culture solution obtained were poured into a 1 liter fermentation vat, and 200 g. crystalline L-aspartic acid to the solution from time to time at 37° C. with agitation over a period of 43 hours whereafter the pH was controlled between 4.7 and 5.0 by addition of 12 N sulfuric acid for a total fermentation period of 46 hours.

The fermentation solution contained 0.14 g./dl. L-aspartic acid and 16.6 g./dl. α-alanine as determined by bioassay. The D-alanine content of the α-alanine was 0.15 g./dl. 98.2 percent of the L-aspartic acid were converted to L-alanine.

87.0 g. crystalline crude L-alanine were obtained from the fermentation solution by the method described in Example 1.

I claim:
1. A method of producing L-alanine by enzyme action which comprises:
   (a) mixing the decarboxylation enzyme of Pseudomonas species No. 618 (ATCC No. 19,121) with an aqueous solution containing L-aspartic acid;
   (b) maintaining the resulting mixture at an approximate pH value of 4.5 to 5.5 until L-alanine is formed; and
   (c) recovering the L-alanine formed from said mixture.
2. A method as set forth in claim 1, wherein said mixture is kept under aerobic conditions at about 24° to 45° C. while being maintained at said pH value.
3. A method as set forth in claim 1, wherein said decarboxylation enzyme is prepared prior to said mixing by culturing said Pseudomonas species in an aqueous medium containing soy bean protein hydrolyzate and a source of assimilable carbon until a culture broth containing said enzyme is formed, the broth being mixed with said aqueous solution.
4. A method as set forth in claim 3, wherein said source of carbon is methanol, ethanol, n-propanol, n-butanol, ethyleneglycol, or glycerin.

References Cited

FOREIGN PATENTS

| | | |
|---|---|---|
| 37/3,543 | 6/1962 | Japan. |
| 37/3,544 | 6/1962 | Japan. |
| 38/26,945 | 12/1963 | Japan. |

LIONEL M. SHAPIRO, Primary Examiner